UNITED STATES PATENT OFFICE.

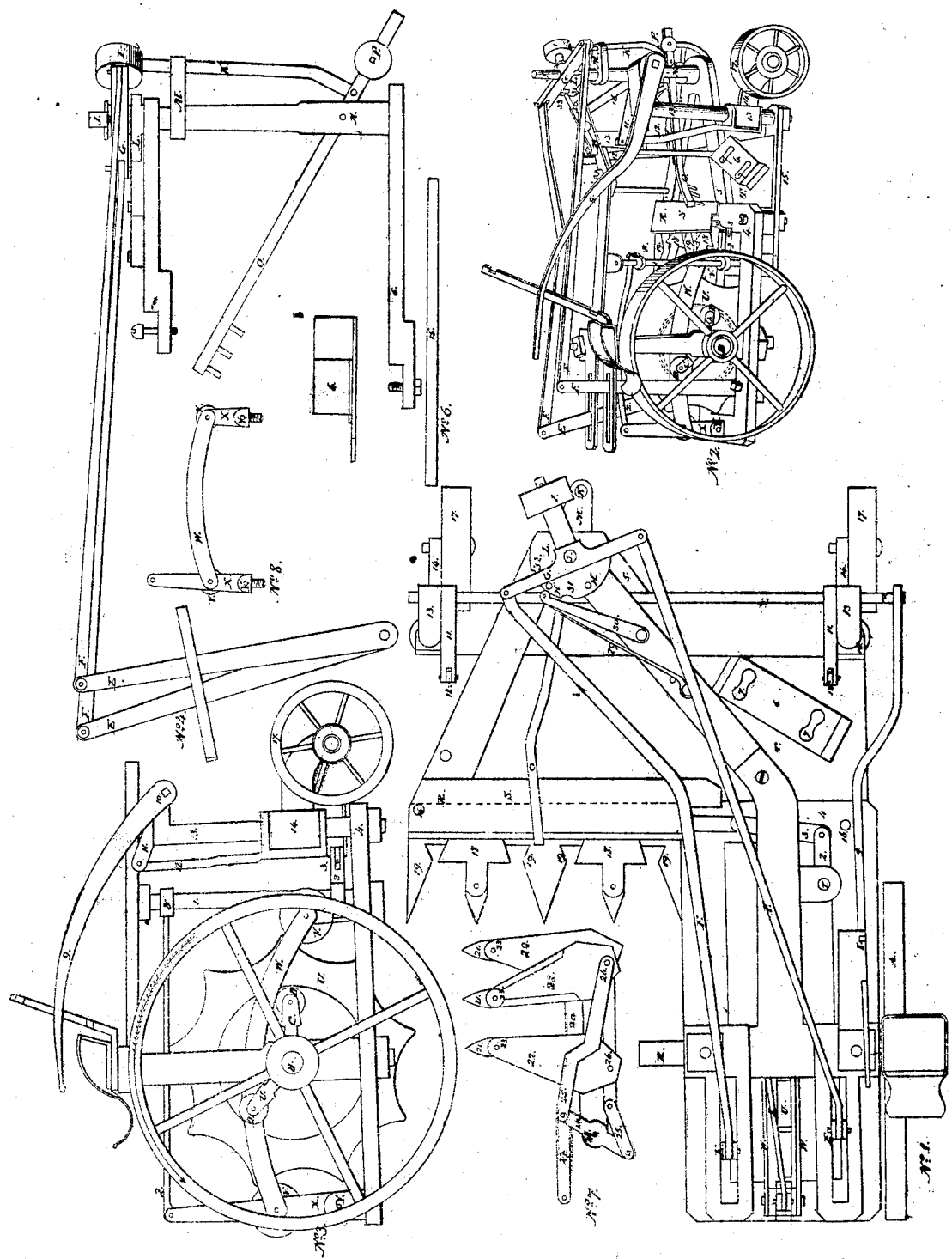

DANIEL C. SMITH, OF TECUMSEH, MICHIGAN.

IMPROVED RAKING APPARATUS FOR HARVESTERS.

Specification forming part of Letters Patent No. 17,703, dated June 30, 1857.

*To all whom it may concern:*

Be it known that I, DANIEL C. SMITH, of Tecumseh, Lenawee county, Michigan, have invented a new and useful Improvement in Grain-Harvesters; and I do hereby declare that the following is a full, clear, and exact description of the construction and operation of the same, reference being had to the annexed drawings (numbered from 1 to 8) thereof, making a part of this specification, in which—

Figure 1 of the said drawings represents a view of the grain-harvester from a point of view directly above the same, exhibiting the combination of the frame of the machine, the frame-work of the rake, the platform T, and the position of the binders at 7 7. Fig. 2 represents a perspective view of the same machine. Fig. 3 represents a side view of the same machine used as a mower, in which the posts 13 13 with the arms, connections, and casters are removed to a new position and secured at the points marked 16 16 in Fig. 1, also showing the harvesting apparatus detached and shown by themselves in Figs. 4 and 5, Fig. 4 representing the frame of and the raking apparatus, and Fig. 5 the platform T and binder's stand. Fig. 6 represents only a part of the frame seen by itself, and being the same piece which constitutes a part of Fig. 5, and as such there marked by the numeral 15. Fig. 7 represents one section of my cutting apparatus, showing its cutters or knives respectively pivoted on each finger in a manner contradistinguished from the cutters or knives as seen at the numerals 18 and 19 in Fig. 1, and there pivoted to alternate fingers.

The mode of operating my machine is as follows:

First, the driving-wheel A in Figs. 2 and 3 gives simultaneous movement to the corrugated wheel U by means of the main shaft B, to which both wheels and also the arms C C are firmly attached. The upright arms X X, partially seen in Figs. 2 and 3, but by section in Fig. 8, pivoted at Y Y and united by their connection W W, receive a vibrating motion from the revolutions of the wheel U by the collision of its outer edge with the friction-rollers V V. Thus vibration of the arms or levers X X through the connection Z with the arm gives motion to the rock-shaft seen at numeral 1, which in turn, by its arms 2 at 3, gives motion to the connection playing beneath the table S, to which connection the knives or cutters 18 18 are pivoted, as well as also pivoted to the fingers forward of the point where the grain or grass is cut, and which cutting is done at 19 19.

Secondly, as seen in Fig. 2, the arms C C, revolving at alternate positions on and with the shaft B—one on each side of the wheel U—strike with their friction-rollers D D alternately against the levers E E, and, through their connections F F with the oscillating arm G, with its friction-roller I, produce, first, the motion of raising the rake O by means of the upright lever or rod K, and, secondly, motion to the rake and rock-shaft J right and left by means of the strokes from the arm G against the pins H H in the plate S, which plate is fastened to or is part of rock-shaft J. The spring 29 in Figs. 1 and 2 of the drawings causes the pawl 30 to mesh into the depression marked 31 and 32 in the plate L, which produces the following-named effects, viz: As the plate L moves around to the left hand the pawl meshes into the right-hand or furthermost depression, holds the said plate L stationary, while the friction-roller I depresses the upright lever or rod K, and raises the rake O from the table, and afterward, being thrown out of the depression by the arm G striking one of the pins H, the plate L moves to the right, the pawl meshes into the other depression, again holds the said plate stationary, whereby the said rake is allowed to drop at the proper place on the table. The pawl is subsequently thrown from this depression by the alternate stroke of the arm G against the other pin, H. The motions thus produced upon the rake O are, first, to raise it from the table after discharging the gavel; secondly, to swing it above the falling grain to the right edge of the table S; thirdly, to drop the rake upon the table at R, and, fourthly, to swing the rake to the left across the table S, with the grain, to a stand for the binders to be placed on platform T, (such stand being omitted in the drawings to allow the frame 5 to be seen.)

The machine is raised or lowered at the operator's pleasure (and turned around the more easily) by means of the lever 9, as seen in Figs. 1 and 3, operating upon shaft 10, which in turn, by the arms 11 11 and connections 12

12, raise or lower arms 14 14 and the casters 17 17, which casters are the rests of the contiguous parts of the machine.

The knives or cutters seen in Fig. No. 7, (marked 22 22, &c.,) being pivoted to the fingers 21 21, &c., at 23 23, &c., forward of the point where the grass and grain are cut, (such fingers being firmly attached to the bar 20,) are operated through the connections 25 25, &c., the oscillating arm 24 by means of the pitman 27, or by a rock-shaft placed at 28.

What I claim as my improvement, and ask Letters Patent for, is as follows:

The mode of operating the rake of a grain-harvester by means of the mechanism above described.

DANIEL C. SMITH.

Witnesses:
EDWIN B. WOOD,
FRANCIS S. SNELL.